United States Patent
Norihisa

(10) Patent No.: US 9,044,838 B2
(45) Date of Patent: Jun. 2, 2015

(54) SPINDLE DEVICE

(75) Inventor: Takashi Norihisa, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 730 days.

(21) Appl. No.: 13/332,828

(22) Filed: Dec. 21, 2011

(65) Prior Publication Data

US 2012/0219374 A1    Aug. 30, 2012

(30) Foreign Application Priority Data

Feb. 25, 2011 (JP) .................. 2011-040547

(51) Int. Cl.
*B23Q 11/12* (2006.01)

(52) U.S. Cl.
CPC ..... *B23Q 11/127* (2013.01); *Y10T 409/303976* (2015.01)

(58) Field of Classification Search
CPC .. B23Q 11/126; B23Q 11/127; B23Q 11/128; B23Q 11/123
USPC .................. 409/135; 384/476, 321
See application file for complete search history.

(56) References Cited

U.S. PATENT DOCUMENTS

| 1,914,498 | A  | * | 6/1933 | Gardner | ............ 384/393 |
| 6,450,073 | B1 | * | 9/2002 | Boyer et al. | ............ 82/129 |
| 2004/0013335 | A1 | * | 1/2004 | Inoue et al. | ............ 384/476 |

FOREIGN PATENT DOCUMENTS

| JP | 05309545 A | * | 11/1993 |
| JP | 06-031585 A1 | | 2/1994 |
| JP | 2000-015541 A1 | | 1/2000 |
| JP | 2000015541 A | * | 1/2000 |
| JP | 2010-221360 A1 | | 10/2010 |

OTHER PUBLICATIONS

Japanese Office Action (Application No. 2011-040547) dated Jun. 4, 2014.

* cited by examiner

*Primary Examiner* — Eric A Gates
*Assistant Examiner* — Paul M Janeski
(74) *Attorney, Agent, or Firm* — Burr & Brown, PLLC

(57) ABSTRACT

A spiral groove flow passage with a clockwise spiral direction and a spiral groove flow passage with a counterclockwise spiral direction are provided inside a spindle. When the spindle is accelerated to rotate in the forward rotation direction, a pressure in the direction of causing a reverse flow of a coolant is applied to the left-hand spiral groove flow passage by the axial-flow pumping action, but a pressure in the forward direction is applied to the right-hand spiral groove flow passage by the same axial-flow pumping action to cancel out the pressure causing the reverse flow described above.

4 Claims, 1 Drawing Sheet

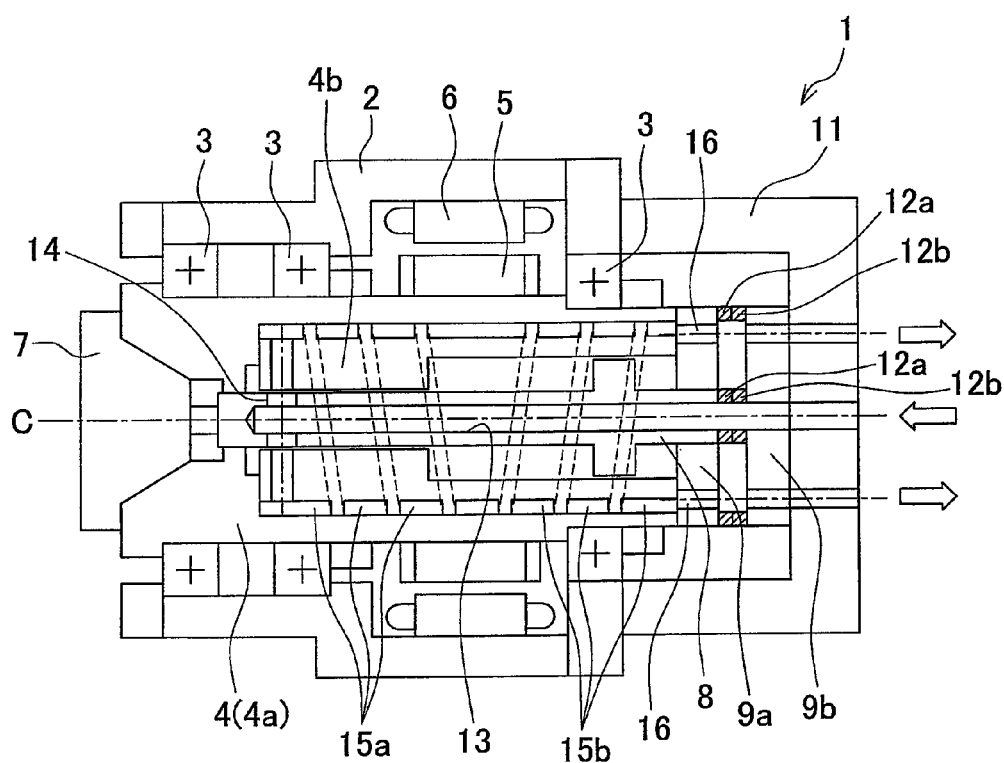

SPINDLE DEVICE

CROSS-REFERENCE TO RELATED APPLICATION

This application claims the benefit of Japanese Patent Application Number 2011-040547 filed on Feb. 25, 2011, the entirety of which is incorporated by reference.

BACKGROUND OF THE INVENTION

1. Field of the Invention

The present invention relates to a spindle device provided in a machine tool or the like and including a cooling flow passage formed inside the spindle device to allow a cooling medium such as a coolant to flow.

2. Description of Related Art

In spindle devices, in general, heat may be produced in bearings for a spindle, a motor that rotates the spindle, and so forth, and the spindle may be heated under the influence of heat produced at a machining point. The produced heat, if no measures are taken against it, may cause thermal expansion of the spindle to deteriorate the machining accuracy, or may break the bearings. Thus, some spindle devices according to the related art are provided with a structure for cooling a spindle. In a spindle device disclosed in Japanese Patent Application Publication No. JP H06-31585 A, for example, a cooling flow passage in the shape of a spiral groove is provided inside the spindle device, and a cooling medium such as a coolant is caused to flow in the cooling flow passage to uniformly cool the entire spindle device.

It is true that the cooling flow passage formed in the shape of a spiral groove in the spindle device disclosed in No. JP H06-31585 A allows the cooling medium to flow at an increased flow rate in the cooling flow passage to improve the cooling efficiency. If a compressible fluid such as air is used as the cooling medium, or if an incompressible fluid such as a coolant is used as the cooling medium but the cooling flow passage is not completely filled with the cooling medium (that is, air or the like is mixed in the cooling flow passage), however, a fluid pressure may be produced by the axial-flow pumping action during acceleration and deceleration. Thus, if the fluid pressure is increased, the cooling medium may leak at a rotary joint portion, for example. Further, if a large amount of the cooling medium leaks at the rotary joint portion, or if a high fluid pressure is applied in the direction of causing a reverse flow of the cooling medium, a sufficient amount of the cooling medium may not be supplied into the spindle device.

SUMMARY OF THE INVENTION

The present invention has been made in view of the foregoing issues, and it is an object of the present invention to provide a spindle device that can be reliably supplied with a cooling medium even during acceleration and deceleration to achieve a highly reliable cooling effect.

In order to achieve the foregoing object, a first aspect of the present invention provides a spindle device including a spindle, and a cooling flow passage formed inside the spindle to allow a cooling fluid to flow, the cooling flow passage extending spirally in an axial direction of the spindle, in which the cooling flow passage includes a first spiral portion extending in a predetermined spiral direction and a second spiral portion extending in a spiral direction opposite the predetermined spiral direction.

A second aspect of the present invention provides the spindle device according to the first aspect, in which the first spiral portion and the second spiral portion may be the same as each other in lead, number of streaks, and length in the axial direction.

A third aspect of the present invention provides the spindle device according to the first or second aspect, in which the spindle may be accelerated counterclockwise as seen from a front side in the axial direction to start rotating, and the cooling flow passage extends from a rear end of the spindle in the axial direction to a space outside the spindle via a rotary joint and a seal portion, and the first spiral portion and the second spiral portion may be provided continuously, and one of the first spiral portion and the second spiral portion that is the closer to the rotary joint and the seal portion has a counterclockwise spiral direction.

According to the present invention, the cooling flow passage includes the first spiral portion extending in the predetermined spiral direction and the second spiral portion extending in the spiral direction opposite the predetermined spiral direction. Therefore, a fluid pressure applied to one of the spiral portions during acceleration and deceleration of the spindle can be at least partially canceled out by a fluid pressure applied to the other spiral portion. Thus, no significant fluid pressure in a predetermined direction is applied to the entire cooling flow passage. Therefore, a cooling medium does not easily leak from a portion to outside the spindle (that is, a rotary joint, a seal portion, or the like), and a sufficient amount of the cooling medium can be supplied into the cooling flow passage, providing a highly reliable cooling effect.

According to the invention of the second aspect, the first spiral portion and the second spiral portion are the same as each other in lead, number of streaks, and length in the axial direction. Therefore, a fluid pressure applied to one of the spiral portions can be completely canceled out by a fluid pressure applied to the other spiral portion, which improves the effect to suppress leakage of the cooling medium and to reliably supply the cooling medium.

According to the invention of the third aspect, the spindle is accelerated counterclockwise as seen from a front side in the axial direction to start rotating, and the cooling flow passage extends from a rear end of the spindle in the axial direction to a space outside the spindle via a rotary joint and a seal portion, and the first spiral portion and the second spiral portion are provided continuously, and one of the first spiral portion and the second spiral portion that is the closer to the rotary joint and the seal portion has a counterclockwise spiral direction. Therefore, a fluid pressure is not easily applied to the rotary joint and the seal portion at the start of rotation when a fluid pressure tends to be produced, in particular, which can further reliably suppress leakage of the cooling medium from the rotary joint and the seal portion.

BRIEF DESCRIPTION OF THE DRAWING

FIG. 1 illustrates a cross section of a spindle device taken in an axial direction.

DETAILED DESCRIPTION OF THE INVENTION

A spindle device according to an embodiment of the present invention will be described in detail below with reference to the drawing.

FIG. 1 illustrates a cross section of a spindle device 1 taken in the axial direction. The left-right direction in FIG. 1 is defined as the front-rear direction of the spindle device 1 (in particular, with the left side defined as the front side). The counterclockwise direction and the clockwise direction as seen from the front side of a spindle 4 in the axial direction are defined as a forward rotation direction and a reverse rotation direction, respectively. Terms "right-hand" and "left-hand" to be discussed later are also defined as seen from the front side of the spindle 4.

The spindle device 1 is provided in a machine tool such as a machining center, for example, and includes the spindle 4 supported in a housing 2 so as to be rotatable about an axis C via a plurality of bearings 3, 3, .... A rotor 5 and a stator 6 are respectively provided on the outer peripheral surface of the spindle 4 and on the inner peripheral surface of the housing 2 at a position facing the rotor 5. The rotor 5 and the stator 6 form a so-called built-in motor structure to make the spindle 4 rotatable. Further, a drawbar 8 that can move back and forth in the front-rear direction is provided at the axial portion of the spindle 4. A tool 7 can be mounted at the front end of the spindle 4 by a holding mechanism (not shown) that acts in accordance with the back-and-forth movement of the drawbar 8.

A structure for cooling the spindle device 1, which is an essential portion of the present invention, will be described.

A joint housing 11 is provided to cover the rear portion of the spindle 4 discussed above. A first rotary joint 9a and a second rotary joint 9b are respectively attached on the rear end surface of the spindle 4 and on the inner surface of the joint housing 11 at a position facing the first rotary joint 9a with a predetermined gap in the axial direction. A space between the rotary joints 9a and 9b is sealed by seal portions 12a, 12a provided to the first rotary joint 9a and seal portions 12b, 12b provided to the second rotary joint 9b. A coolant for cooling the spindle device 1 is fed from the outside of the joint housing 11 into the spindle device 1 (in particular, into the spindle 4), and thereafter discharged back to the outside of the joint housing 11. The coolant is fed from a supply source formed by a supply device provided outside the spindle device 1.

In order to feed and discharge the coolant as discussed above, the spindle device 1 is provided with feed flow passages 13, 14, spiral groove flow passages 15a, 15b, and discharge flow passages 16, 16 serving as a cooling flow passage that allows the coolant to flow. The first feed flow passage 13 penetrates through the center of the joint housing 11 and the rotary joints 9a, 9b to extend in a shaft portion of the drawbar 8 along the axial direction to a location close to the front end of the drawbar 8. An opening of the joint housing 11 is connected to the coolant supply source (not shown). The second feed flow passage 14 is provided to extend in the radial direction at a location close to the front end of the drawbar 8. The second feed flow passage 14 connects between the first feed flow passage 13 and the spiral groove flow passage 15a to be discussed later.

The spindle 4 has a double structure formed by an outer member 4a which has a columnar housing space at its axial portion and the outer peripheral surface of which is supported by the bearings 3, 3, ..., and a columnar inner member 4b mounted in the housing space of the outer member 4a. The spiral groove flow passage 15a and the spiral groove flow passage 15b are formed continuously between the outer member 4a and the inner member 4b. The spiral groove flow passages 15a, 15b are formed with the outer member 4a covering spaces between projecting streak portions provided spirally on the outer peripheral surface of the inner member 4b. The projecting streak portions are projected in the radial direction. The spiral groove flow passage 15a provided on the front side of the spindle 4 is formed as a right-hand spiral groove with a clockwise spiral direction. On the other hand, the spiral groove flow passage 15b provided on the rear side of the spindle 4 is formed as a left-hand spiral groove with a counterclockwise spiral direction (that is, the spiral direction of the projecting streak portions is reversed between the front portion and the rear portion of the inner member 4b). The spiral groove flow passage 15a and the spiral groove flow passage 15b are the same as each other in lead (intervals between the projecting streak portions in the axial direction), number of streaks, and length in the axial direction. Further, the discharge flow passages 16, 16 are provided to extend in parallel with the axial direction from positions corresponding to a rear-end opening of the spiral groove flow passage 15b so as to penetrate through the rotary joints 9a, 9b and the joint housing 11.

According to the spindle device 1 having the cooling flow passage described above, the coolant is first fed through the inside of the drawbar 8 via the first feed flow passage 13 to a location in the vicinity of the front end of the spindle 4, and thereafter fed in the radial direction via the second feed flow passage 14. After passing through the spiral groove flow passages 15a, 15b, the coolant is discharged to the outside via the discharge flow passages 16, 16. Thus, when the spindle 4 is accelerated to rotate in the forward rotation direction, a pressure in the direction of causing a reverse flow of the coolant is applied to the left-hand spiral groove flow passage 15b by the axial-flow pumping action, but a pressure in the forward direction is applied to the right-hand spiral groove flow passage 15a by the same axial-flow pumping action to cancel out the pressure causing the reverse flow described above. When the spindle 4 is decelerated (that is, the spindle 4 is subjected to acceleration in the reverse rotation direction), as opposed to the case of acceleration, a pressure in the direction of causing a reverse flow of the coolant is applied to the spiral groove flow passage 15a by the axial-flow pumping action, but is also canceled out by a pressure applied to the spiral groove flow passage 15b. That is, according to the spindle device 1, no significant fluid pressure in either the forward direction or the reverse direction is applied to the entire spiral groove flow passages 15a, 15b during acceleration and deceleration of the spindle 4. Therefore, the coolant does not easily leak from the rotary joints 9a, 9b, the seal portions 12a, 12b, or the like, and a sufficient amount of the coolant can be supplied into the cooling flow passage, providing a highly reliable cooling effect.

The spiral groove flow passage 15b which is the closer to the rotary joints 9a, 9b and the seal portions 12a, 12b is left-handed (that is, has a counterclockwise spiral direction). Therefore, a fluid pressure in the direction of causing a reverse flow of the coolant (that is, causing the coolant to flow toward the side opposite the rotary joint 9a) is applied to the spiral groove flow passage 15b when the spindle 4 starts to accelerate from a stationary state, when air or the like easily gets mixed into the cooling flow passage. Thus, leakage of the coolant from the rotary joints 9a, 9b, the seal portions 12a, 12b, or the like can be suppressed further effectively.

Furthermore, the spiral groove flow passage 15a and the spiral groove flow passage 15b are the same as each other in lead, number of streaks, and length in the axial direction. Therefore, the pressures in directions opposite each other produced in the spiral groove flow passage 15a and the spiral groove flow passage 15b can completely cancel out each other, which further improves the effect to suppress leakage of the coolant and to reliably supply the coolant.

The spindle device according to the present invention is not limited in any way to the embodiment described above. Changes may be made as appropriate without departing from the scope and spirit of the present invention in the configuration of the cooling flow passage, the type of the cooling medium, and so forth, not to mention the type of the machine tool in which the spindle device is provided.

For example, in the embodiment described above, the right-hand spiral groove flow passage 15a and the left-hand spiral groove flow passage 15b are formed on the front side and the rear side, respectively, of the spindle 4. However, the right-hand spiral groove flow passage and the left-hand spiral groove flow passage may be formed on the rear side and the front side, respectively, of the spindle 4. Alternatively, a right-hand spiral groove flow passage may be formed at the front end and the rear end of the spindle 4, and a left-hand spiral groove flow passage may be formed at the center portion of the spindle 4. The arrangement of a right-hand spiral groove flow passage and a left-hand spiral groove flow passage may be changed as appropriate in accordance with the rotational direction of the spindle 4, the circumstances in which a pressure due to the axial-flow pumping action tends to be produced, and so forth.

The right-hand spiral groove flow passage 15a and the left-hand spiral groove flow passage 15b may not necessarily be the same as each other in lead, number of streaks, and length in the axial direction, and design changes may be made as appropriate to the lead, the number of streaks, and the length in the axial direction of the spiral groove flow passages.

Furthermore, the direction in which the cooling medium is supplied to the cooling flow passage may also be changed as appropriate. The cooling medium may be supplied in the direction opposite the direction in the embodiment described above, and may be fed from the side of the spiral groove flow passages to be discharged to the rear of the spindle through the center of the drawbar.

In the spindle device according to the embodiment described above, a tool can be mounted to the spindle 4. However, it is a matter of course that the configuration for the cooling flow passage described above may also be applied to a spindle device in which a spindle is configured to grasp a workpiece. The cooling medium is also not limited to a coolant.

What is claimed is:

1. A spindle device comprising:
a spindle supported in a housing so as to be rotatable in the housing via a plurality of bearings; and
a cooling flow passage formed inside the spindle to allow a cooling fluid to flow, the cooling flow passage extending spirally in an axial direction of the spindle, wherein
the cooling flow passage includes a first spiral portion extending in a predetermined spiral direction and a second spiral portion extending in a spiral direction opposite the predetermined spiral direction.

2. The spindle device according to claim 1, wherein
the first spiral portion and the second spiral portion are the same as each other in lead, number of streaks, and length in the axial direction.

3. The spindle device according to claim 1, wherein:
the spindle is accelerated counterclockwise as seen from a front side in the axial direction to start rotating, and the cooling flow passage extends from a rear end of the spindle in the axial direction to a space outside the spindle via a rotary joint and a seal portion; and
the first spiral portion and the second spiral portion are provided continuously, and one of the first spiral portion and the second spiral portion that is the closer to the rotary joint and the seal portion has a counterclockwise spiral direction.

4. The spindle device according to claim 2, wherein:
the spindle is accelerated counterclockwise as seen from a front side in the axial direction to start rotating, and the cooling flow passage extends from a rear end of the spindle in the axial direction to a space outside the spindle via a rotary joint and a seal portion; and
the first spiral portion and the second spiral portion are provided continuously, and one of the first spiral portion and the second spiral portion that is the closer to the rotary joint and the seal portion has a counterclockwise spiral direction.

* * * * *